United States Patent
Lahr

(12) United States Patent Lahr
(10) Patent No.: US 6,830,397 B2
(45) Date of Patent: Dec. 14, 2004

(54) EXPANDABLE AND CONTRACTIBLE KEYBOARD DEVICE

(75) Inventor: Roy J. Lahr, Los Angeles, CA (US)

(73) Assignee: RAST Associates, LLC, Long Beach, CA (US)

( * ) Notice: Subject to any disclaimer, the term of this patent is extended or adjusted under 35 U.S.C. 154(b) by 0 days.

(21) Appl. No.: 10/317,824

(22) Filed: Dec. 12, 2002

(65) Prior Publication Data

US 2003/0143010 A1 Jul. 31, 2003

Related U.S. Application Data

(60) Provisional application No. 60/339,663, filed on Dec. 12, 2001.

(51) Int. Cl.[7] .............................................. G06F 3/023
(52) U.S. Cl. ...................... 400/492; 400/490
(58) Field of Search .................. 400/489, 490, 400/492, 496; 341/22; 345/168, 169; 361/68

(56) References Cited

U.S. PATENT DOCUMENTS

| 5,044,798 | A | | 9/1991 | Roylance et al. | 400/472 |
|---|---|---|---|---|---|
| 5,141,343 | A | | 8/1992 | Roylance et al. | 400/472 |
| 5,163,765 | A | * | 11/1992 | Levy | 400/492 |
| 5,870,034 | A | * | 2/1999 | Wood | 341/22 |
| 6,111,527 | A | * | 8/2000 | Susel | 341/22 |
| 2001/0002647 | A1 | * | 6/2001 | Hayashi et al. | 200/344 |
| 2001/0028712 | A1 | | 10/2001 | Lahr | 379/368 |
| 2003/0063939 | A1 | * | 4/2003 | Lin | 400/472 |

* cited by examiner

*Primary Examiner*—Daniel J. Colilla
(74) *Attorney, Agent, or Firm*—Kenyon & Kenyon

(57) ABSTRACT

An expandable keyboard includes a plurality of expandable keytops, a keyswitch corresponding to each keytop and a force vectoring device arranged between each keytop and corresponding keyswitch. The force vectoring device is configured to direct force applied to any portion of the keytop to the keyswitch.

16 Claims, 5 Drawing Sheets

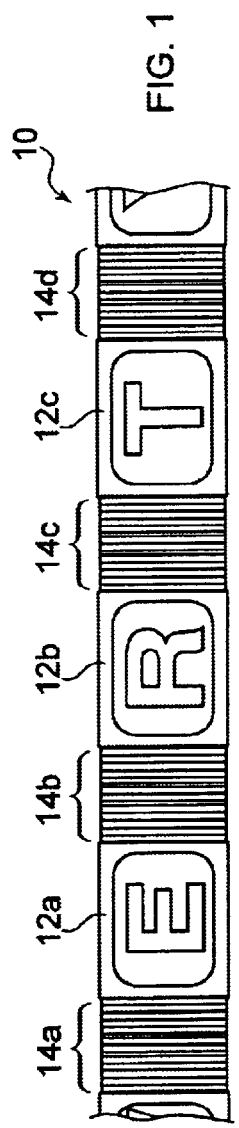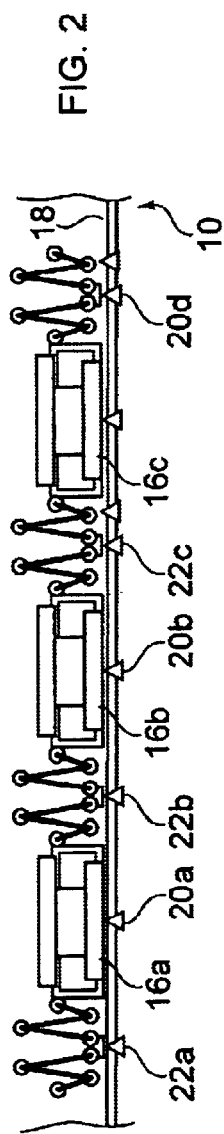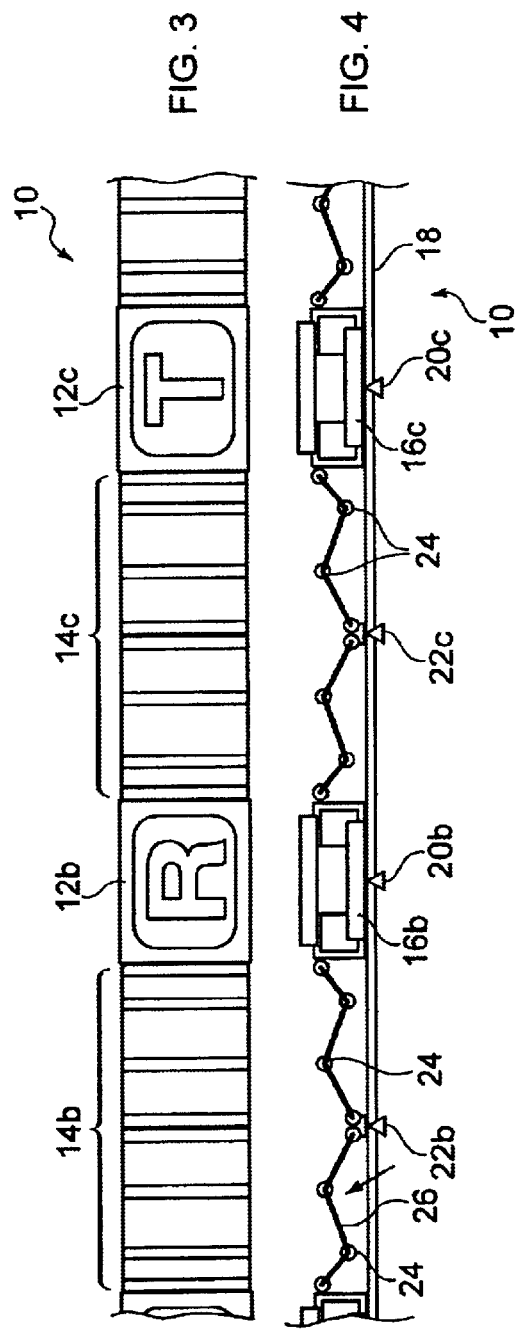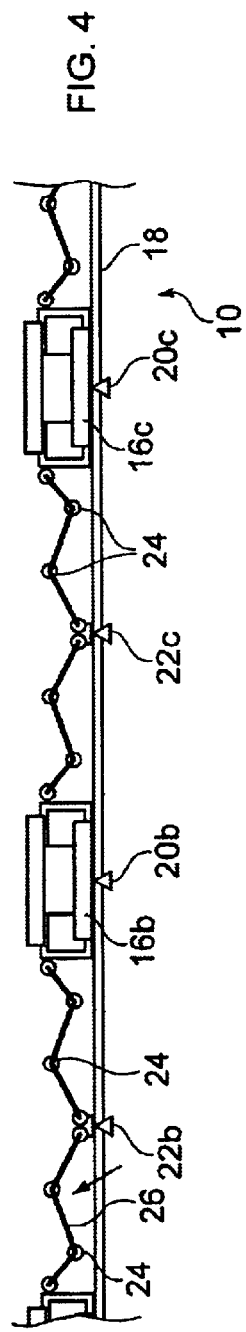

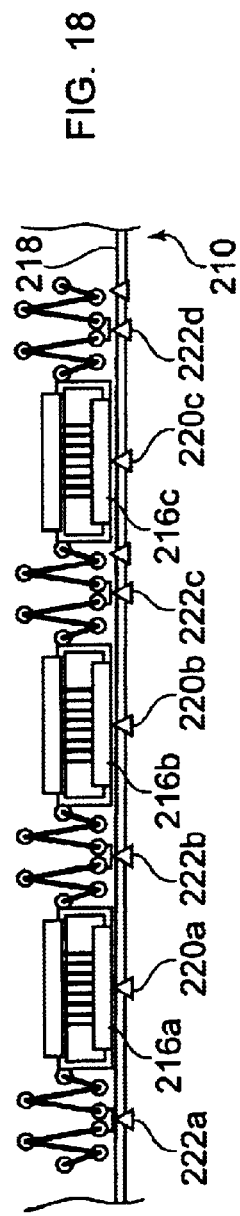
FIG. 17
FIG. 18
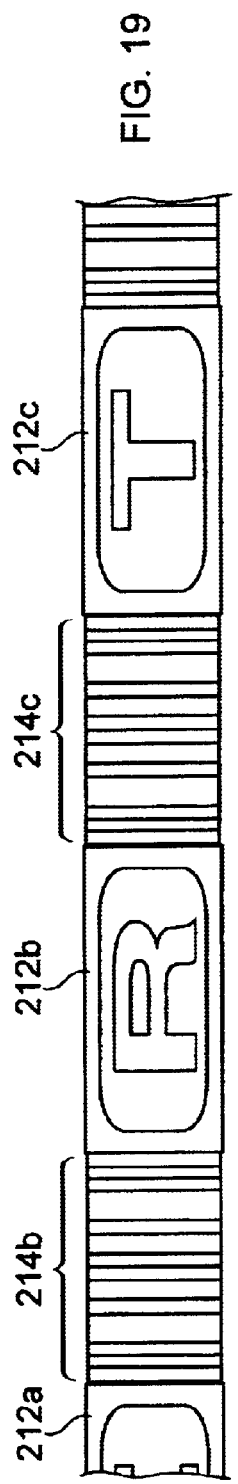
FIG. 19
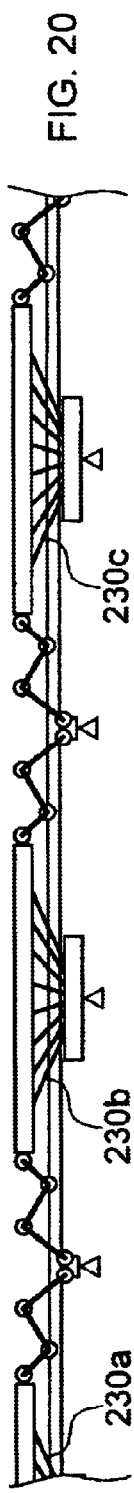
FIG. 20

EXPANDABLE AND CONTRACTIBLE KEYBOARD DEVICE

CROSS-REFERENCE TO RELATED APPLICATIONS

The present application claims the benefit of U.S. Provisional Patent Application No. 60/339,663, filed on Dec. 12, 2001, which is expressly incorporated herein by reference thereto.

FIELD OF THE INVENTION

The present invention relates to an expandable and contractible keyboard device. More particularly, the present invention relates to an expandable and contractible keyboard device having a force vectoring device.

BACKGROUND INFORMATION

It is possible to construct a keyboard that is laterally expandable and contractible. Such keyboards are described, for example, in U.S. patent application Ser. No. 09/558, 866, entitled "Expandable and Contractible Keyboard with Adjustable Key Sizes, " and U.S. Patent Application Publication No. 2001/0028712, entitled "Expandable and Contractible Keyboard with Adjustable Key Sizes, " each of which is expressly incorporated herein in its entirety by reference thereto.

It is also possible to construct a keyboard that is laterally expandable but has fixed-width keytops. This arrangement allows the user to have a compact keyboard, e.g., with substantially less than ¾" center-to-center spacing of keytops for "single-finger" typing but provides an expanded width keyboard, for example, having nominal ¾" center-to-center spacing of the keytops, when "touch-typing" is desired, such as for long messages.

It may be desirable that the keyboard, when not expanded, is wide enough to permit single-finger typing. When touch-typing is desired, however, the keyboard, which may include, for example, an expandable fabric or other elastomeric web base, may include some form of laterally-expandable keytops. This arrangement permits a compact form of a keyboard for quick use with single-finger typing and an expanded form for touch-typing.

Conventional keyboards include fixed-size membrane keyswitches as the actuator to signal which of the keys is being pressed by the user's fingertip. Membrane switches are inexpensive but reliable. It is not common to provide membrane switches that are variable in size. A membrane keyswitch may include, for example, two flat conductive membranes spaced apart by a short distance. This spacing may be maintained by a thin insulative sheet with a central aperture between the two conductive membranes. The upper membrane is deformed down through the aperture so as to touch the lower membrane, and this contact completes a circuit and results in a logic signal being sent to a keyboard matrix decoder to send the correct character signal to the attached computer or other electronic device, such as, for example, a portable or handheld device.

Since the membrane keyswitch has a fixed size, but the keyboard mounting web and keytops may be expandable, the fingertip may not be positioned directly over the membrane keyswitch. If the fingertip is not positioned directly over the membrane keyswitch, the downward pressure may not actuate the keyswitch, thereby failing to produce the desired logic signal.

FIG. 1 is a top plan view of a keyboard device 10 in a contracted state, and FIG. 2 is a schematic side elevational view of the keyboard device 10 illustrated in FIG. 1 in the contracted state. Keyboard device 10 includes a plurality of keytops 12a, 12b, 12c, each of which is a fixed-size keytop. The keytops may be arranged according to the standard QWERTY arrangement, a non-US variation thereof, e.g., AZERTY, and/or a standard personal computer operating system arrangement. Arranged between each adjacent pair of keytops 12a, 12b, 12c is a hinge device 14a, 14b, 14c, 14d. Each hinge device 14a, 14b, 14c, 14d may include a plurality of self-hinged segments, which may be formed, for example, of hard plastic, polypropylene, an elastic material, a woven stretch material, etc. Beneath each keytop 12a, 12b, 12c is a respective keyswitch 16a, 16b, 16c, which may include, for example, a membrane keyswitch. Each keyswitch 16a, 16b, 16c and each hinge device 14a, 14b, 14c, 14d is secured to a stretchable web 18 via mounts 20a, 20b, 20c and 22a, 22b, 22c, 22d.

FIG. 3 is a schematic top plan view of the keyboard device 10 illustrated in FIGS. 1 and 2 in an expanded state, and FIG. 4 is a schematic side elevational view of the keyboard device 10 illustrated in FIGS. 1 to 3 in the expanded state. Each hinge device 14a, 14b, 14c, 14d includes a plurality of segments 26 connected to each other, to the respective keytop 12a, 12b, 12c, to keyswitch 16a, 16b, 16c and/or to mount 22a, 22b, 22c, 22d via hinges 24. As illustrated in FIGS. 2 and 4, the width of each keytops 12a, 12b, 12c is approximately equal to the width of each keyswitch 16a, 16b, 16c.

FIG. 5 is a schematic side elevational view of a fingertip 28 on a keytop 12 of the keyboard 10 in a contracted state, and FIG. 6 is a schematic side elevational view of a fingertip 28 on the keytop 12 of the keyboard 10 in an expanded state. As illustrated in FIG. 6, it is seen that the fingertip 28 in positions a and c may not effectively close the keyswitch 16. Thus, the user must position his fingertip 28 approximately in the center, i.e., in position b, to effectively close the keyswitch 16.

It is therefore an object of the present invention to provide an expandable keyboard device having a force vectoring device between the keytop and the respective keyswitch.

SUMMARY

The above and other beneficial objects of the present invention are achieved by providing an expandable keyboard device as described herein.

According to one example embodiment of the present invention, an expandable keyboard includes at least one keytop, a keyswitch corresponding to each keytop and a force vectoring device provided between each keytop and the respective keyswitch.

According to an example embodiment of the present invention, a keyboard device includes a web including a plurality of keytops, the web expandable and contractible between an expanded position and a contracted position, a plurality of keyswitches, and a force-vector device arranged between the keytops and the keyswitches, the force-vector device configured to transmit a force from the keytop toward a respective keyswitch in the expanded position and the contracted position.

The force-vector device may include a fill material arranged between the web and the keyswitches and a plurality of rigid members arranged in the fill material. The rigid members may be pivotally arranged with respect to the respective keyswitch. One end of each rigid member may be arranged in a substantially fixed positional relationship to the respective keyswitch and another end of each rigid member may be arranged in a substantially fixed positional relationship to the respective keytop.

The force-vector device may include a substantially fixed width on a keyswitch-side thereof and a width on a key-top side thereof expandable and contractible in accordance with the expansion and contraction of the web.

The force-vector device may include a plurality of blades arranged between the keytops and the keyswitches, each blade connected to the keytop at a respective attachment point and connected to a dome portion arranged over an active portion of the keyswitch at a respective pivot point. The blades may be rigid, and/or the blades may be formed of plastic.

In the contracted position, the keytops may have a concave shape, and in the expanded position, the keytops may have a substantially planar shape. Alternatively, or in addition, in the contracted position, the keytops may have a concave shape, and in the expanded position, the keytops may have a convex shape.

Each keyswitch may include a membrane keyswitch.

The keytops in the contracted position may be arranged for single-finger data entry, and the keytops in the expanded position may be arranged for touch-type data entry.

The keyboard device may include a plurality of hinge devices, each arranged between a respective pair of adjacent keytops, and the hinge devices may be configured to expand and contract in accordance with expansion and contraction of the web. Each hinge device may include a plurality of self-hinged segments, and each self-hinged segment may be formed of plastic.

The web may be formed of a stretchable material, an elastic material, etc. The keytops may correspond to at least one of an alphanumeric keyboard arrangement, a telephone keypad arrangement and a calculator keypad arrangement.

BRIEF DESCRIPTION OF THE DRAWINGS

FIG. 1 is a schematic top plan view of a keyboard device in a contracted state.

FIG. 2 is a schematic side elevational view of the keyboard device illustrated in FIG. 1 in the contracted state.

FIG. 3 is a schematic top plan view of the keyboard device illustrated in FIGS. 1 and 2 in an expanded state.

FIG. 4 is a schematic side elevational view of the keyboard device illustrated in FIGS. 1 to 3 in the expanded state.

FIG. 17 is a schematic top plan view of an expandable keyboard with expandable-width keytops in a contracted state.

FIG. 18 is a schematic side view of the expandable keyboard illustrated in FIG. 17 in the contracted state.

FIG. 19 is a schematic top plan view of the expandable keyboard illustrated in FIGS. 17 and 18 in an expanded state.

FIG. 20 is a schematic side view of the expandable keyboard illustrated in FIGS. 17 to 19 in the expanded state.

DETAILED DESCRIPTION

Figure 5:
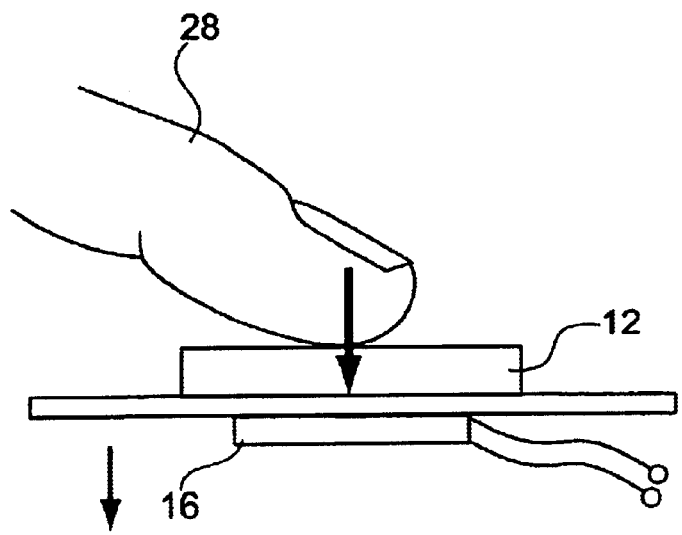
FIG. 5 is a schematic side elevational view of a fingertip on a keytop in a contracted state.
Figure 6:
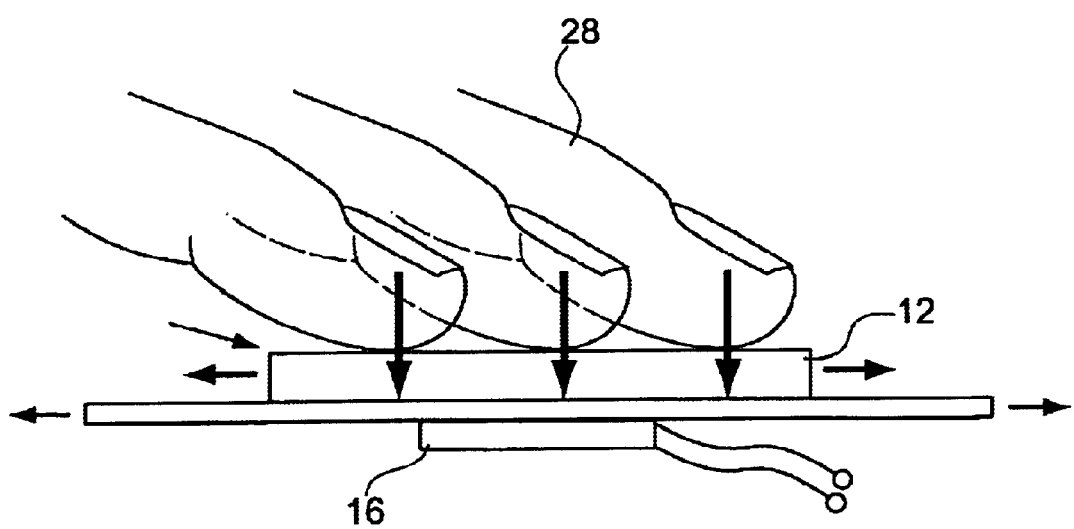
FIG. 6 is a schematic side elevational view of a fingertip on the keytop in an expanded state.
Figure 7:
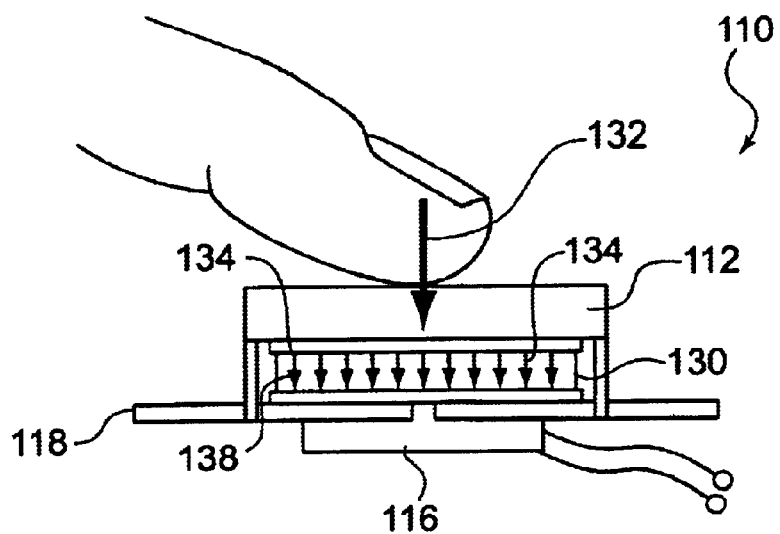
FIG. 7 is a schematic side elevational view of a fingertip on the keytop in a contracted state.

FIG. 7 is a schematic side elevational view of a keyboard device 110 according to the present invention. The keyboard device 110 includes an expandable keytop 112 and a membrane keyswitch 116 fixed to a stretchable web 118. FIG. 7 illustrates the keytop in a contracted state. Disposed between the keytop 112 and the keyswitch 116 is a force vectoring device 130. The force vectoring device 130 may include, for example, a plurality of vectoring members arranged in, for example, an elastomeric fill material 138. Pressure exerted by a fingertip 128 on the keytop 112 in the direction of arrow 132 is transmitted by the force vectoring device 130 to the keyswitch 116 in the direction of arrows 134.

Figure 8:
FIG. 8 is a schematic side elevational view of a force vectoring device.

FIG. 8 is a schematic side elevational view of the force vectoring device 130. The top of the force vectoring device 130 may be fixed to the expandable keytop 112 by, for example, an adhesive. It should be appreciated that the top of the force vectoring device is expandable with the keytop 112 and that the bottom of the force vectoring device has a fixed width since the bottom of the force vectoring device is fixed to the keyswitch or to a baseplate. Thus, when the stretchable web 118 is and keytop(s) 112 are expanded for touch-typing use, the top of the force vectoring device 130 will expand with the keytop 112, but the bottom of the force vectoring device 130 will not expand.

Figure 9:
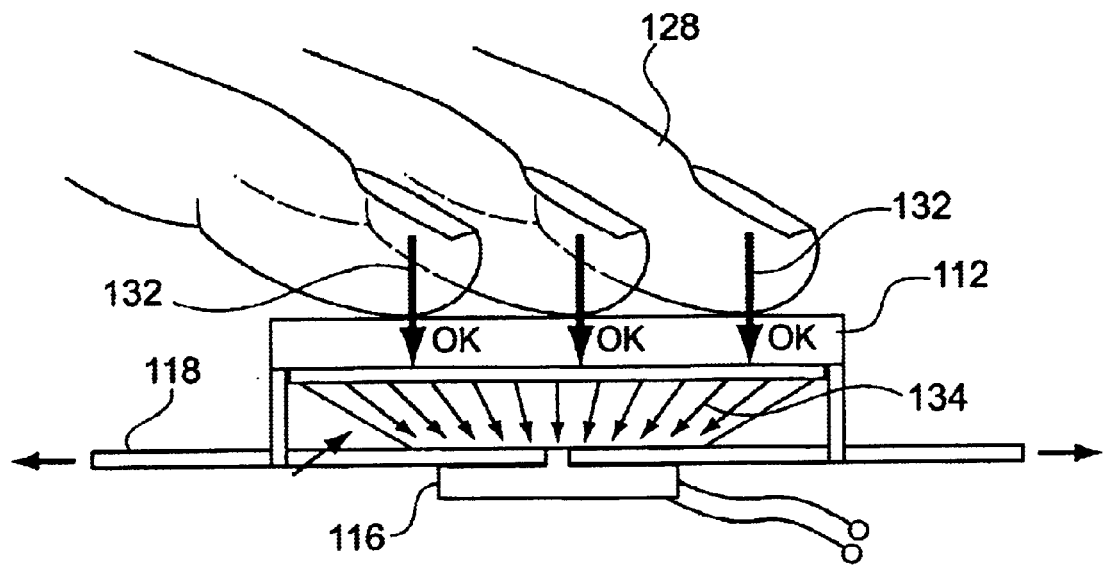
FIG. 9 is a schematic side elevational view of a fingertip on the keytop in an expanded state.

FIG. 9 is a schematic side elevational view of a fingertip 128 on the keytop 112 in an expanded state. As illustrated in FIG. 9, the fingertip pressure 132 is directed by the force vectoring device 130 to the keyswitch 116 in the direction of arrows 134 regardless of the position of the fingertip 128 on the keyswitch 112.

Figure 10:
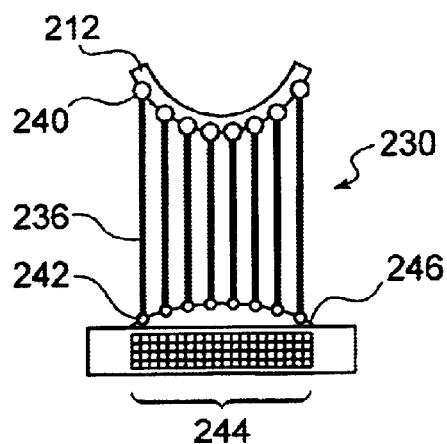
FIG. 10 is a schematic cross-sectional side view of the expanding keytop with a force vectoring device in a contracted state.

FIG. 10 is a schematic side cross-sectional view of an example embodiment of an expandable keytop 212 having a force vectoring device 230. The expandable keytop 212 may be formed, for example, of a woven or other elastomeric material. The force vectoring device 230 includes a plurality of blades 236, which may be, for example, formed of a hard and/or rigid material, such as plastic. Each blade 236 is connected to the keytop 212 at a respective attachment point 240 and connected to a dome portion 246 via a respective hinge point 242. The dome portion 246 is arranged over the active portion 244 of the membrane keyswitch 216. The blades 236 may be connected to the keytop 212 at the respective attachment point 240 by, for example, glue or other adhesive material, and may be attached to the dome portion 246 at the respective hinge point 242 by, for example, glue strips. The dome portion 246 may be upwardly curved to prevent the blades from accidently touching the membrane keyswitch when no pressure is applied to the keytop 212.

Figure 11:
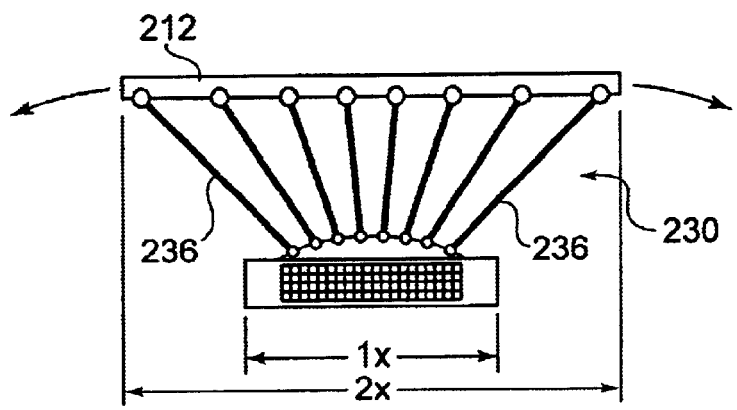
FIG. 11 is a schematic cross-sectional side view of the expanding keytop with the force vectoring device illustrated in FIG. 10 in an expanded state.
Figure 12:
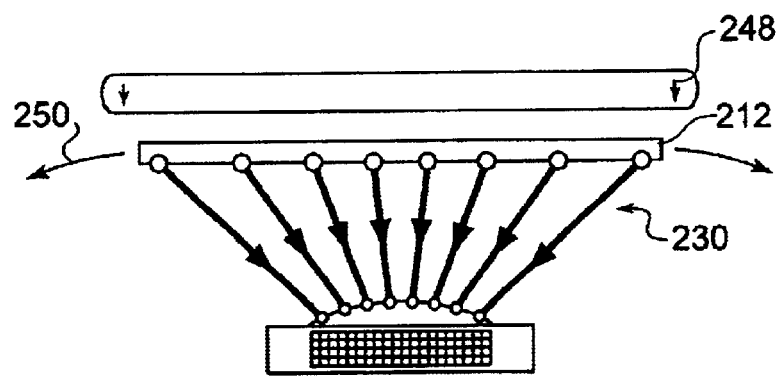
FIG. 12 is a schematic cross-sectional side view of the expanding keytop with the force vectoring device illustrated in FIGS. 10 and 11 illustrating the force vectoring action thereof.

FIG. 11 is a schematic side cross-sectional view of the expanding keytop 212 and force vectoring device 230 in the expanded state, and FIG. 12 is a schematic side cross-sectional view of the vectoring action of the expanding keytop 212 and force vectoring device 230 in the expanded state. The arrows 236 indicate the direction of force transmitted by force vectoring device 230 by fingertip pressure applied to the keytop in the region indicated by 248. The arrows 250 indicate the direction of force used to expand the keytop 212 from the contracted state to the expanded state.

Figure 13:
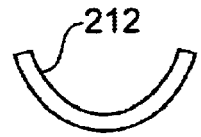
FIG. 13 is a schematic side view of an example embodiment of an expanding keytop in a contracted state.
Figure 14:
FIG. 14 is a schematic side view of the example embodiment of the expanding keytop illustrated in FIG. 13 in an expanded state.

As illustrated in FIG. 10, the keytop 212 in the contracted state has a concave shape from the user's perspective. This shape is also illustrated in FIG. 13, which is a schematic side cross-sectional view of the keytop 212 in the contracted state. As illustrated in FIGS. 11 and 12, the keytop 212 in the expanded state is substantially flat. FIG. 14 is a schematic side cross-sectional view of the keytop 212 in the expanded state.

Figure 15:
FIG. 15 is a schematic side view of another example embodiment of an expanding keytop in a contracted state.
Figure 16:
FIG. 16 is a schematic side view of the example embodiment of an expanding keytop illustrated in FIG. 15 in an expanded state.

FIG. 15 is a schematic side cross-sectional view of another example embodiment of the keytop 312 having a concave shape, from the user's perspective, in the contracted state, and FIG. 16 is a schematic side cross-sectional view of the keytop 312 having a convex shape, from the user's perspective, in the expanded state. The keytop 212 illustrated in FIGS. 10 and 13 has a greater concavity than the keytop 312 illustrated in FIG. 15.

FIG. 17 is a schematic top plan view of an expandable keyboard 210 with expandable-width keytops 212a, 212b, 212c in a contracted state, and FIG. 18 is a schematic side elevational view of the expandable keyboard 210 illustrated in FIG. 17 in the contracted state. The keyboard 210 includes a plurality of keyswitches 216a, 216b, 216c, each corresponding to a respective one of the keytops 212a, 212b, 212c. The keytops may correspond, for example, to an alphanumeric keyboard arrangement, e.g., a QWERTY arrangement, a non-US variation thereof, e.g., AZERTY, etc., a telephone keypad arrangement, a calculator keypad arrangement, etc. Each keyswitch 216a, 216b, 216c is mounted to a stretchable web 218 at a mount 220a, 220b, 220c. Between each pair of keyswitches 216a, 216b, 216c is a hinge device 214a, 214b, 214c, 214d. Each hinge device 214a, 214b, 214c, 214d is secured to the adjacent keyswitch 216a, 216b, 216d and/or keytop 212a, 212b, 212c. Each hinge device 214a, 214b, 214c, 214d is also secured to the web 218 via a mount 222a, 222b, 222c, 222d. Arranged between each keytop 212a, 212b, 212c and the corresponding keyswitch 216a, 216b, 216c is a force vectoring device 230a, 230b, 230c.

FIG. 19 is a schematic top plan view of the expandable keyboard 210 illustrated in FIGS. 17 and 18 in an expanded state, and FIG. 20 is a schematic side elevational view of the expandable keyboard 210 illustrated in FIGS. 17 to 19 in the expanded state.

What is claimed is:

1. A keyboard device, comprising:
    an elastic web including a plurality of keytops, the web expandable and contractible between an expanded position and a contracted position;
    a plurality of keyswitches; and
    a force-vector device arranged between the keytops and the keyswitches, the force-vector device configured to transmit a force from the keytop toward a respective keyswitch in the expanded position and the contracted position.

2. The keyboard device according to claim 1, wherein each keyswitch includes a membrane keyswitch.

3. The keyboard device according to claim 1, wherein the keytops in the contracted position are arranged for single-finger data entry and the keytops in the expanded position are arranged for touch-type data entry.

4. The keyboard device according to claim 1, further comprising a plurality of hinge devices, each hinge device arranged between a respective pair of adjacent keytops, the hinge devices configured to expand and contract in accordance with expansion and contraction of the web.

5. The keyboard device according to claim 4, wherein each hinge device includes a plurality of hinged segments.

6. The keyboard device according to claim 5, wherein each hinged segment is formed of plastic.

7. The keyboard device according to claim 1, wherein the keytops correspond to at least one of an alphanumeric keyboard arrangement, a telephone keypad arrangement and a calculator keypad arrangement.

8. A keyboard device, comprising:
    a web including a plurality of keytops, the web expandable and contractible between an expanded position and a contracted position;
    a plurality of keyswitches; and
    a force-vector device arranged between the keytops and the keyswitches, the force-vector device configured to transmit a force from the keytop toward a respective keyswitch in the expanded position and the contracted position;
    wherein the force-vector device includes a fill material arranged between the web and the keyswitches and a plurality of rigid members arranged in the fill material.

9. The keyboard device according to claim 8, wherein the rigid members are pivotally arranged with respect to the respective keyswitch.

10. The keyboard device according to claim 8, wherein one end of each rigid member is arranged in a substantially fixed positional relationship to the respective keyswitch and another end of each rigid member is arranged in a substantially fixed positional relationship to the respective keytop.

11. A keyboard device, comprising:
    a web including a plurality of keytops, the web expandable and contractible between an expanded position and a contracted position;
    a plurality of keyswitches; and
    a force-vector device arranged between the keytops and the keyswitches, the force-vector device configured to transmit a force from the keytop toward a respective keyswitch in the expanded position and the contracted position;
    wherein the force-vector device includes a substantially fixed width on a keyswitch-side thereof and a width on a key-top side thereof expandable and contractible in accordance with the expansion and contraction of the web.

12. A keyboard device, comprising:
    a web including a plurality of keytops, the web expandable and contractible between an expanded position and a contracted position;
    a plurality of keyswitches; and a force-vector device arranged between the keytops and the keyswitches, the force-vector device configured to transmit a force from the keytop toward a respective keyswitch in the expanded position and the contracted position;

wherein the force-vector device includes a plurality of blades arranged between the keytops and the keyswitches, each blade connected to the keytop at a respective attachment point and connected to a dome portion arranged over an active portion of the keyswitch at a respective pivot point.

13. The keyboard device according to claim 12, wherein the blades are rigid.

14. The keyboard device according to claim 12, wherein the blades are formed of plastic.

15. A keyboard device, comprising:

a web including a plurality of keytops, the web expandable and contractible between an expanded position and a contracted position;

a plurality of keyswitches; and a force-vector device arranged between the keytops and the keyswitches, the force-vector device configured to transmit a force from the keytop toward a respective keyswitch in the expanded position and the contracted position;

wherein in the contracted position, the keytops have a concave shape, and in the expanded position, the keytops have a substantially planar shape.

16. A keyboard device, comprising:

a web including a plurality of keytops, the web expandable and contractible between an expanded position and a contracted position;

a plurality of keyswitches; and a force-vector device arranged between the keytops and the keyswitches, the force-vector device configured to transmit a force from the keytop toward a respective keyswitch in the expanded position and the contracted position;

wherein in the contracted position, the keytops have a concave shape, and in the expanded position, the keytops have a convex shape.

* * * * *